United States Patent

Svensson

(10) Patent No.: US 9,539,992 B2
(45) Date of Patent: Jan. 10, 2017

(54) METHOD FOR OPERATING AN ELECTROMECHANICAL VEHICLE BRAKE SYSTEM

(71) Applicant: FORD GLOBAL TECHNOLOGIES, LLC, Dearborn, MI (US)

(72) Inventor: Thomas Svensson, Leichlingen (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/738,687

(22) Filed: Jun. 12, 2015

(65) Prior Publication Data

US 2015/0360664 A1 Dec. 17, 2015

(30) Foreign Application Priority Data

Jun. 13, 2014 (DE) .......................... 10 2014 211 378

(51) Int. Cl.
*G06F 7/70* (2006.01)
*B60T 8/32* (2006.01)
(Continued)

(52) U.S. Cl.
CPC ............... *B60T 8/3255* (2013.01); *B60T 7/12* (2013.01); *B60T 7/22* (2013.01); *B60T 8/3275* (2013.01);
(Continued)

(58) Field of Classification Search
USPC .......................................................... 701/70
See application file for complete search history.

(56) References Cited

U.S. PATENT DOCUMENTS 6,059,380 A * 5/2000 Pueschel ................. B60T 8/175
303/113.2
6,082,830 A 7/2000 Volz et al.
(Continued)

FOREIGN PATENT DOCUMENTS

DE         196 15 449 B4     10/1997
DE    10 2007 049 516 A1     4/2008
(Continued)

OTHER PUBLICATIONS

Examination Report dated Jan. 28, 2015 issued in related German Application No. 10 2014 211 377.6.
(Continued)

*Primary Examiner* — Hussein A. Elchanti
(74) *Attorney, Agent, or Firm* — Jones Robb, PLLC; Raymond L. Coppiellie

(57) ABSTRACT

A method is provided for operating an electromechanical vehicle brake system having an ESP module and at least two brake circuits, each brake circuit comprising high and low pressure switching valves, a low pressure storage device, and two wheel brakes. The method comprises, in advance of a possible breaking procedure and based on a trigger factor, filling the low pressure storage device with an amount of brake fluid at a first pre-pressure. Subsequently, an ESP pump is used to fill the vehicle brake system, including the low pressure storage device, with an adjustable amount of final pre-pressure. All valves are closed when the final pre-pressure is achieved. The method further comprises, during a braking procedure, opening respective inlet valves of the wheel brakes and supplying at least a part of the final pre-pressure to at least one wheel brake of the vehicle brake system.

15 Claims, 1 Drawing Sheet

(51) Int. Cl.
  *B60T 7/12*   (2006.01)
  *B60T 7/22*   (2006.01)
  *B60T 13/66*  (2006.01)
  *B60T 8/48*   (2006.01)

(52) U.S. Cl.
  CPC ............ *B60T 13/662* (2013.01); *B60T 8/4872* (2013.01); *B60T 2201/10* (2013.01); *B60T 2201/12* (2013.01)

(56) References Cited

U.S. PATENT DOCUMENTS

| | | | |
|---|---|---|---|
| 6,203,116 | B1 | 3/2001 | Dieckmann |
| 6,499,812 | B1 | 12/2002 | Gronau et al. |
| 7,866,761 | B2 | 1/2011 | Gerum et al. |
| 8,271,172 | B2 | 9/2012 | Heller et al. |
| 8,770,673 | B2 | 7/2014 | Wuerth et al. |
| 2002/0153767 | A1 | 10/2002 | Pasterkamp et al. |
| 2003/0234576 | A1 | 12/2003 | Reuter et al. |
| 2008/0175736 | A1* | 7/2008 | Choi ................. F01C 21/0854 418/23 |
| 2009/0314256 | A1* | 12/2009 | Bland ................. F02C 3/305 123/456 |
| 2010/0010716 | A1 | 1/2010 | Sawada et al. |
| 2010/0213757 | A1* | 8/2010 | Wagner ................. B60T 8/34 303/10 |
| 2011/0248560 | A1 | 10/2011 | Vollert et al. |
| 2012/0255817 | A1 | 10/2012 | Vollert et al. |
| 2013/0338894 | A1 | 12/2013 | Olofsson |
| 2014/0058641 | A1* | 2/2014 | Theel ................. B60T 8/172 701/70 |
| 2016/0031423 | A1* | 2/2016 | Ishida ................. B60T 8/348 303/11 |

FOREIGN PATENT DOCUMENTS

| | | |
|---|---|---|
| DE | 10 2008 054 856 A1 | 7/2010 |
| DE | 10 2009 028 010 B3 | 1/2011 |
| DE | 10 2013 222 880 A1 | 5/2014 |
| EP | 2 409 885 A1 | 1/2012 |

OTHER PUBLICATIONS

Examination Report dated Feb. 18, 2015 issued in corresponding German Application No. 10 2014 211 378.4.
Examination Report dated Mar. 12, 2015 issued in related German Application No. 10 2014 211 380.6.
Non-Final Office Action dated Mar. 24, 2016 in U.S. Appl. No. 14/738,687.
Non-Final Office Action dated Apr. 13, 2016 in U.S. Appl. No. 14/738,676.
Notice of Allowance dated Sep. 15, 2016, in co-pending U.S. Appl. No. 14/738,676.
Notice of Allowance dated Aug. 30, 2016, in co-pending U.S. Appl. No. 14/738,692.

* cited by examiner

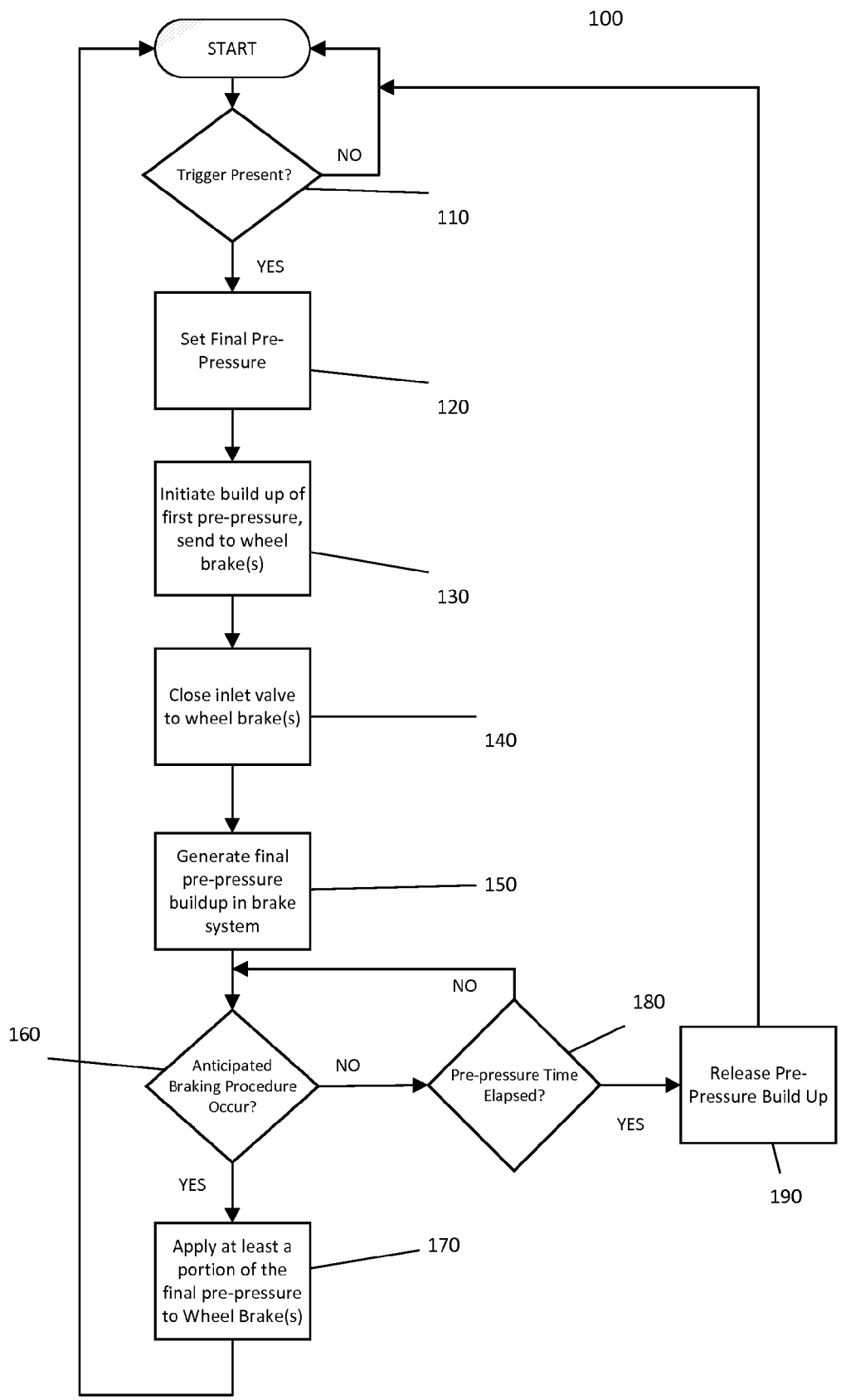

METHOD FOR OPERATING AN ELECTROMECHANICAL VEHICLE BRAKE SYSTEM

CROSS REFERENCE TO RELATED APPLICATIONS

This application claims priority to German Application No. 10 2014 211 378.4, filed on Jun. 13, 2014, the entire content of which is incorporated by reference herein.

This application is related to U.S. patent application Ser. No. 14/738,692, filed Jun. 12, 2015, which claims priority to German Application No. 10 2014 211 380.6, filed on Jun. 13, 2014. This application is also related to U.S. patent application Ser. No. 14/738,676, filed Jun. 12, 2015, which claims priority to German Application No. 10 2014 211 377.6, filed on Jun. 13, 2014. The entirety of the contents of each of these related applications is incorporated herein by reference.

TECHNICAL FIELD

The present disclosure relates generally to a method for operating an electromechanical brake system, in particular a vehicle brake system.

BACKGROUND

Brake assist systems that are installed in vehicles assist the person controlling the vehicle, in particular, during brake applications in hazardous or emergency situations. The principle of such brake assist systems is based on evaluating accident events. It has been recognized during such evaluations that the respective possible braking force amplification is actually only rarely used since the actuation of the foot brake is too weak or too hesitant. This produces a disadvantageous extension of the braking distance which can lead by way of example to rear end collisions.

Conventional braking force boosters operate with an evacuated volume. The difference between the low pressure and the pressure of the atmosphere is used to generate an auxiliary force. This auxiliary force is used to increase the manually-provided actuating force so that the actual braking force is composed of the total of the actuating force and the auxiliary force. In contrast thereto, electromechanical brake systems function in a vacuum-less manner. The brake pressure is generated exclusively by means of one or more multiple electric motors. A mechanical connection is not provided between the brake pedal and the wheel brake or wheel brakes. The noticeable resistance, by way of example at the brake pedal, is specifically generated in the form of feedback.

A certain amount of inertia arises in the response behavior of electromechanical brake systems of this type as a result of the connection of electronic and mainly hydraulic components. In other words, electromechanical brake systems require a dedicated reaction time period between the deceleration request and the point in time at which the braking procedure actually occurs.

In view of these observations, there is still room for improvement in electromechanical brake systems.

SUMMARY

In accordance with various exemplary embodiments of the present disclosure, a method for operating an electromechanical vehicle brake system having an ESP module and at least two brake circuits, each brake circuit comprising high and low pressure switching valves, a low pressure storage device, and two wheel brakes is provided. The method comprises, in advance of a possible breaking procedure and based on a trigger factor, filling the low pressure storage device with an amount of brake fluid at a first pre-pressure while a respective inlet valve of each wheel brake is closed and a respective outlet valve of each wheel brake is opened, subsequently using an ESP pump to fill the vehicle brake system, including the low pressure storage device, with an adjustable amount of final pre-pressure, and closing all valves when the final pre-pressure is achieved. The method further comprises, during a braking procedure, opening at least the respective inlet valves and supplying at least a part of the final pre-pressure to the wheel brakes of the vehicle brake system.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 1 is a flow chart illustrating an exemplary embodiment of a method of operating an electromechanical brake system in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method for operating an electromechanical brake system for a vehicle is provided, the method improving the efficiency of the brake system both in the case of a deceleration request that is instigated by a person controlling the vehicle or is trigged by an autonomous system and also in the case of a vehicle being controlled automatically.

Accordingly, a method for operating such an electromechanical vehicle brake system is described hereafter. The vehicle brake system comprises an ESP module, at least two brake circuits having in each case two wheel brakes that are each allocated at least one inlet valve and at least one outlet valve. Each brake circuit comprises at least one HS valve and at least one US valve and at least one low pressure storage device. The method, in accordance with the present disclosure, provides that in advance of a possible braking procedure a final pre-pressure is built up in at least one part of the vehicle brake system. The term 'final pre-pressure' can mean a build-up of pressure in at least one region of the hydraulic part of the vehicle brake system. The final pre-pressure is not available directly from the start of the operation of the vehicle but rather is only built up on the basis of a trigger factor. In order to build up the final pre-pressure, the respective inlet valve is closed and the respective outlet valve leading to the low pressure storage device is opened so that the low pressure storage device is filled with an amount of first pre-pressure of brake fluid, wherein once the amount of first pre-pressure is achieved an ESP pump is started in order to fill the at least one part of the vehicle brake system including the low pressure storage device with an amount of final pre-pressure that can be adjusted in dependence upon a factor, wherein all valves are closed if the set amount of final pre-pressure is achieved.

If all valves are closed, the amount of final pre-pressure is stored and is completely available to the wheel brakes if it is necessary to engage the wheel brakes accordingly. For this purpose, it is only necessary to open the inlet valves. The amount of final pre-pressure that is also in the respective low pressure storage device is therefore generated on the basis of the trigger factor that will be mentioned in detail later. The amount of final pre-pressure that is stored in the respective low pressure storage device is therefore also available to the wheel brakes when the inlet valves, and optionally the outlet valves, are open.

It is provided that the final pre-pressure that has been previously built up by means of the pump of the ESP module is supplied to at least one of the wheel brakes of the vehicle brake system during the braking procedure that has occurred. It is possible to supply either all the final pre-pressure or only part thereof to the wheel brake. As an alternative thereto, it is provided that the final pre-pressure can be supplemented by an additional pressure that is dependent at least upon the intensity of the braking procedure. The total pressure achieved from the final pre-pressure and the additional pressure is supplied at least in part in the respective required amount to the at least one wheel brake.

The advantages arising from this manifest themselves in a noticeable improvement in the efficiency of the electromechanical vehicle brake system that is operated in this manner. The final pre-pressure that is built up on the basis of one or various trigger factors by means of the ESP module, in other words by means of the ESP pump, leads to a significant reduction in the reaction time of a system of this type. The background for this is that a sufficiently high brake pressure is available prior to each potential braking procedure. As the anticipated braking procedure actually occurs, this sufficiently high brake pressure can then be used directly either completely or only in the required amount in order to directly influence the wheel brake. A quicker flow of fluid to the at least one wheel brake is achieved as a result of the substantially immediate possibility of taking pressure from the system that has been pre-charged with pressure in this manner. In this respect, it is possible to reduce the reaction time of known electromechanical vehicle brake systems in the ideal case to almost zero.

The improvement in efficiency that can be achieved is above the current level of the reaction ability of vacuum-based conventional brake systems. This is regardless of the fact as to whether this is initiated by a manual input, in other words by means of a driver's wish, or autonomous systems. The disclosed method is to be understood as a type of function that can take place in parallel with or in combination with already existing control functions. It is possible in this manner to directly retro-fit by way of example already existing vehicles insofar as said vehicles have the corresponding responsive hardware. It is naturally also possible to retro-fit any vehicles that first require to be fitted with the corresponding hardware in order to perform the method proposed here.

The actual trigger factor or factors for building up the pre-pressure can be found anywhere where it is possible to give an indication of a possible impending braking procedure. It follows from this that the term 'trigger factor' is to be understood to be fundamentally all indicators that render it possible to provide a prognosis in this direction. Since the improvement in efficiency that can be achieved by means of the present disclosure occurs in many areas, the possible trigger factors for an operation of this type of an electromechanical vehicle brake system are correspondingly numerous.

For example, a first of these trigger factors may include using the manner of activation of the respective control element for regulating the engine power as an indicator of a possibly impending braking process. Although the control element may be, for example, a gas valve or other type of auxiliary device, the measure described here will be explained in more detail below with reference to a foot pedal, more precisely a gas pedal/accelerator pedal.

The type of gas reduction achieved when the person controlling the vehicle lifts his foot from the gas pedal/accelerator pedal may be used as a basis for concluding a possibly directly impending braking process. For example, this may be a sudden rapid release of the gas pedal. This is, of course, necessary whenever the right foot which typically operates the accelerator pedal is to be removed from the accelerator pedal as quickly as possible and placed on the brake pedal in order to brake the vehicle.

In practice, the first trigger factor can be defined on the basis of a discernible rate of change of the gas pedal or also by means of an internal calculation of the rapid release of the gas pedal. Expressed as a function, this could be by way of example as follows:

```
Acc_ped_rate_of_change =
        abs ( ( Acc_ped_pos_current − Acc_ped_pos_prev ) /
        sample_time )
IF      Acc_ped_rate_of_change ≥ Acc_ped_rate_thresh
        Acc_ped_quick_release = 1
ELSE
        Acc_ped_quick_release = 0
ENDIF
```

In so doing, "Acc_ped_rate_of_change" represents the rate of change of the gas pedal, whereas "Acc_ped_pos_current" represents the actual position of the gas pedal and "Acc_ped_pos_prev" represents the previous position of the gas pedal. The respective period of observation for this is regarded as "sample_time" and "Acc_ped_rate_thresh" represents a rate of change that is evaluated as a rapid release of the gas pedal so as to initiate a braking procedure. Finally, this term "Acc_ped_quick_release" contains either the value "0" or "1" to indicate whether the gas pedal has been released rapidly in terms of an impending braking procedure or not. The result "0" indicates no action, whereas "1" is used as a trigger factor for building up the pre-pressure.

Finally, the function described here is used for filtering the movements of the gas pedal in such a manner that a release of the gas pedal can be evaluated as being the commencement for the subsequent actuation of the vehicle brake. In actual fact, this filtering process can be set to be extremely sensitive since the build-up of final pre-pressure by means of the ESP pump comprises merely a preventive measure that initially does not have any direct effect. Instead, the resultant improvement in braking time provided by this function should be such the threshold can be set relatively low so that a braking process which is actually imminent is detected in all cases.

In order to set the level of sensitivity with respect to the activation by means of this function, it is preferred that the value "Acc_ped_rate_thresh" can be set. Furthermore, the filtering can be performed in such a manner that the rate of change is calculated over a longer period of time in order in this manner to reduce the effects of the switchover or of possible signal errors.

Thus, the function can comprise by way of example a learning portion or can itself be embodied as a learning function. For this purpose, the rates of change, to be more precise the respective release of the accelerator pedal, can be observed over a relatively long time period in such a way that the conclusion that a braking process is actually imminent achieves a higher level of accuracy. The objective here is the gradual changing of the value which is responsible for the sensitivity of the activation of the function. The broader the basis for this value is, as a result of the learning character of the function, the more accurate or rather smoother is its adjustment.

Possible signal errors in the input signals that are relevant for the function can arise mainly from the gas pedal position signal that measures the respective release rate of the gas pedal. This can under certain conditions have an undesired offset or accuracy problems at particular points in time and with regard to the release rate of the gas pedal. Its influence can be reduced accordingly or even eliminated as a result of the previously described learning character of the function.

The position of the gas pedal and/or the rate of change up to an upper limit and/or lower limit can naturally also be rounded off in order in this manner to be able to provide an additional measure for the input filtering process.

In accordance with one aspect of the disclosure, a signal of a detection device can be used in order to be used as a second trigger factor for the build-up of the final pre-pressure. This can be, for example, a detection device for detecting objects such as is present in a collision warning device of the vehicle. Such devices are usually optical systems for the detection of the surroundings which may include, for example, an optical sensor such as, for example, a camera and/or a radar system. These devices also may include all further sensor types which serve to detect physical obstacles.

When a relevant object is detected by means of the detection device, the signal, which is available to the vehicle or brake control systems without the involvement of the controlling person (e.g., driver), can be used to initiate buildup of the pre-charge pressure by means of the ESP pump. It is sometimes possible in this manner to switch the brake into the readiness mode quite early in advance of a necessary braking maneuver so as to reduce the collision or perform an emergency braking procedure. As a result of the foresight with respect to a possible braking maneuver, there is generally a sufficiently long time period for the buildup of the respectively necessary pre-pressure. In combination with a vehicle-side collision warning device, there is a high-performance brake system whose safety can be significantly increased by operation using the method disclosed herein.

The method of the present disclosure also is suitable for combination with an automatic parking system. Systems of this type can be, for example, a fully automatic and/or a remote-controlled parking system. When initiating the automatic parking procedure of the vehicle, it is possible to use as a third trigger factor the fact that a value for the ambient temperature that can be set or established is not achieved. The background for this is that the brake fluid that is present in the hydraulic part of the brake system has a naturally higher viscosity at lower temperatures. In particular, during the winter months, the colder ambient temperatures require an increased brake pressure to provide the required braking force.

In accordance with the present disclosure, it is generally possible, in order to determine the variable magnitude of the respective final pre-pressure, to use the value of the actual ambient temperature that has been specifically measured or has been made available by way of an already existing module or sensor in the vehicle. The variable magnitude, in other words the factor-dependent setting of the final pre-pressure, as well as the ambient temperature as a factor for the general setting of the variable final pre-pressure, will be described below.

In conjunction with automatic parking systems, in some cases small distances are used to carry out the parking maneuver (i.e., the space available for parking is minimal). In such cases, it is desirable that the reaction time between the deceleration request and the actual implementation is as short as possible. As explained above, this is not necessarily the case in particular at low temperatures. The present disclosure teaches that the more viscous brake fluid should be compensated for.

It should be understood that the present teachings are not limited to the use of the current ambient temperature but also includes, for example, the actual temperature of the brake fluid. The actual temperature of the brake fluid has been empirically found to deviate, under certain circumstances, from the ambient temperature, with the result that this difference can also be taken into account with respect to the magnitude of the pre-charge pressure level which is to be built up. In any case, the ambient temperature and/or the actual temperature of the brake fluid can therefore be used as a third triggering factor for the build-up of the pre-pressure. In this manner, an at least light pre-pressure of the brake system is desired in order to sufficiently counteract the higher viscosity of the brake fluid. The respective magnitude of the pressure level can depend, for example, on the type of brake fluid and/or the ambient temperature.

At this point it will generally be clarified that the possible braking process which is to be detected can be implemented in a variety of ways. Reference is made here, in particular, to the possibility of a manual deceleration request and/or deceleration request based on an autonomous decision of a vehicle system. In this way, the advantages achieved based on the present disclosure can be realized by all forms of deceleration requests with respect to the sources and/or triggers thereof.

In accordance with one exemplary embodiment of the method of the present disclosure, the build-up of the final pre-pressure can occur in two stages as has already been discussed above. This means that the final pre-pressure can initially achieve a starting magnitude, in other words the first pre-pressure value, and subsequently can increase, for example, to a final magnitude, in other words up to the respective selected final pre-pressure. A two-stage pressure build-up of this type is advantageous when used in conjunction with the first and/or second trigger factor. This is due to the fact that the vehicle may be moving at significantly higher speeds during these triggers than in the case of automatic parking. In this respect it is to be assumed that the required pre-charge pressure is correspondingly higher when the vehicle is moving faster in order to achieve a sufficient braking effect.

In accordance with the present teachings, when an initial level of the pre-charge pressure is built up on the basis of the first triggering factor and/or the second triggering factor, the pre-charge pressure can be passed directly to the at least one wheel brake during the buildup of the pre-charge pressure. As a result, for example, the brake pads or brake calipers can be moved as close as possible to the brake component to which they correspond. The brake components may be, for example, a brake disk or a brake drum. As a result, the possibly increased viscosity of the brake fluid such as can occur at low ambient temperatures can, as it were, also be compensated for.

The present disclosure further provides that the brake system that is to be operated in the disclosed manner comprises valve devices, in other words the HS valve (HSV=high pressure switching valve), the low pressure switching valve (US valves that can also be described as the pilot valve) and the inlet and outlet valves, the valve devices being connected upstream of the respective wheel brake. These valve devices can be a type of shut-off valve or a type of proportional valve such as a pressure conveying valve and/or "TMC cut valve" (TMC=tandem master cylinder). Some of these valve devices have the advantage that the brake fluid can possibly pass through in a step-less manner. In each case, at least the inlet valve should be suitable so as upon opening to convey in the desired amount to its output and consequently to the wheel brake the pressure that is prevailing at the input of the inlet valve.

The starting pre-pressure, in other words the first pre-pressure value, can for example, be between about 0.3 bar to about 3.0 bar, and in one exemplary embodiment may be between about 1.0 bar to about 3.0 bar. Subsequently, the final pre-pressure can be increased, for example, from about 3.0 bar to about 30.0 bar and, consequently, to its final magnitude using the ESP pump. In this manner, sufficient pre-pressure is available in the brake system and, when required, can be conveyed directly, at least in part, to the at least one wheel brake. For this purpose, in the case of the prevailing pre-pressure, the valve device can be opened at least in part during the braking procedure, wherein the amount of pressure stored in the low pressure storage device is also available.

Thus, it is possible to charge the brake system with the pre-pressure that has built up on the basis of the first and/or second trigger factor, sometimes well in advance of a possible braking maneuver, and the pre-pressure is then available almost immediately as required in a deceleration event. As used herein, the term 'final pre-pressure/pre-pressure' is intended to mean both the starting pre-pressure and also the final pre-pressure. In other words, the term 'final pre-pressure' is used in this case as a collective term for its starting and amount of final pressure, wherein the term 'pre-pressure' is also occasionally used.

It is advantageous to select as a final pre-pressure that is as high as possible to provide sufficient braking output during the impending braking maneuver. However, the pre-pressure is built up by means of the ESP pump occurs when the inlet valve device is closed, with the result that the final pre-pressure buildup initially does not generate any perceptible effects on the wheels and instead advantageously provides a high preventive pre-stress in the brake system, which can be called upon immediately when required.

Further advantageous developments of the basic premise of the present disclosure include the possible dependency of the respective level of the pre-charge pressure, to be more precise the initial pre-charge pressure and the ultimate pre-charge pressure, on any factors. Additionally or alternatively to this, the disclosure provides such a dependence also for the respective time period over which the pre-charge pressure is maintained. There can also be possible dependences on, for example, relevant external conditions.

For example, according to one exemplary embodiment, the method takes into account use of the windscreen wiper device that is on-board the vehicle. This device comprises regularly a windscreen wiper that is used to clean the windscreen in combination with windscreen washer water or to remove any water, such as possibly rain water, that is located on a region of the windscreen of the vehicle. In particular, the last variant is to be interpreted as an indication that the underlying surface to be traveled on is possibly wet with rainwater. In particular, the latter variant is to be interpreted as an indication that the road surface over which the vehicle is to travel is possibly likewise wetted with rain water. This information can consequently be used in order to adjust the magnitude of the pre-pressure, such as the final pre-pressure, to suit the respective road conditions. It is thus possible in the case of rain water to assume that the static friction of wheels on the road surface will be mostly reduced, so that a high braking effect that occurs in a short period of time can lead quickly to the wheel that has been decelerated in this manner to become locked. In contrast to dry weather conditions, the magnitude of the respective pre-pressure can be less in order to take into consideration this condition accordingly.

It is also possible in this connection to take into consideration the possible operating position of the windscreen wiper device. Above all, the speed of the active windscreen wiper is of interest, the speed can be, for example, quick or slow. It is possible in a simple manner to derive from the speed of the wiper device information regarding the possible road surface conditions. Accordingly, it is possible to conclude from a rapid operation of the wiper device that the road surface is unsafe as compared to a time when operation of the wiper device is a slow operation. The aim is to achieve a braking efficiency in the system that is tailored to suit in an ideal manner. For this purpose, the length of the period of time for maintaining and/or for building up the respective pre-pressure is preferably kept variable and can be adjusted in dependence upon the factors. This applies accordingly for the respective magnitude of the matching pre-pressure. The automatic setting of the respective values can be performed, for example, on the basis of the type of vehicle and further individual embodiments. It is possible to access accordingly stored or calculable limit values for the individual situation.

The previously described setting possibility can advantageously also take place on the basis of the respective ambient temperature. In this context, for example, different hardnesses of the vehicle tires can also be taken into account as a function of the ambient temperature. It is also conceivable here to use the detected power system voltage of the vehicle. The respectively present power system voltage can have effects on whether and/or to what extent the available support takes place without adversely influencing and/or disrupting other devices and functions of the vehicle. In the case of a power system voltage which is in a low range it can therefore be possible to use the function or not. For example, in the case of a power system voltage of 6.0 volts it can be possible that the function is not available. In contrast, in the case of a power system voltage of 13.0 volts there should be optimum performance of the function.

The present disclosure also provides that the setting can also take place on the basis of other potentially adverse circumstances which are detected, for example, by means of optical systems which are already present or which are to be specially arranged in the vehicle. In this context, circumstances which can adversely affect the braking behavior of the vehicle in relation to the respective underlying surface could be taken into account. It is therefore conceivable, for example, to detect an underlying surface in poor condition, which could provide information about the underlying surface which is still to be traveled on. Poor underlying surface conditions such as, for example, uneven areas ranging up to the differentiation of metal or non-metal sections could also therefore be input into the setting of the pre-stressing times and the pre-stressing pressures. Such measures advantageously contribute to developing the method of operation of the brake system in accordance with the present disclosure, increasing driver comfort and stability of the vehicle.

Factors for the setting possibilities which are based on the respective transmission ratio and/or the yaw rate of the vehicle can also be used. Of course, the function described here also can be limited to the fact that it is only available when a specific value of the speed of the vehicle is exceeded. This value can be different depending on the respective activation conditions for the buildup of the pre-charge pressure. It is conceivable here, for example, to take into account the speed of the vehicle during the automatic parking (third trigger factor) only to a small extent, or not to take it into account at all. In contrast, the function can be tied, in combination with the first and/or second triggering factor, to the fact that the function is only available starting from a speed of, for example, 90 km/h. The availability of the function can also be limited to a range of, for example, 90 km/h to 120 km/h.

In consideration of the previously discussed periods of time, the disclosure preferably provides the following measures:

As soon as the condition for the first triggering factor is met, the function could start with the use of the electric motor, in other words the ESP pump. This can, for example, build up the first pre-pressure with a slow rotation over an initial period of time during which pre-charging occurs. The starting pre-pressure could be held for an initial period of time during which pre-charging occurs, for example, for a period of up to about 5.0 seconds. The starting pre-pressure could have a value of, for example, up to about 3.0 bar. In the case of a closed valve device, the function continues to use the electric motor, in other words the ESP pump, in order to build up the final pre-pressure to, for example, between about 3.0 bar and about 30.0 bar. The final pre-pressure may be variable, in other words can be adjusted in a factor dependent manner. The achieved final pre-pressure can then be held for a continuing period of time during which pre-charging occurs. The period of time may be, for example, up to about an additional 5.0 seconds.

If, during the period of time during which the pre-charging with pressure occurs, it is recognized that the brake pedal has been actuated and, consequently, that the driver has actively requested that the vehicle be decelerated, the brake system can commence providing the requested level of deceleration.

If the brake pedal is not activated and the brake system is pre-charged to the final pre-pressure and the continuing period of time during which the pre-charging with pressure occurs is exceeded, the function could commence with reducing of the pre-pressure. This reduction process could continue until, for example, the initial pressure levels have been achieved. Furthermore, in the event that the brake pedal is not further actuated, it is possible for the function to commence from this point in time a cycle of building up pressure which builds up the final pre-pressure and holds it for the continuing period of time during which the pre-charging with pressure occurs.

It goes without saying that the brake pedal that is used for the preceding description can also be provided by means of a different brake device.

With regard to the second trigger factor, it is possible in the presence of the second trigger factor for the function to commence with the pressure build-up as previously described for the first trigger factor. However, other values could be provided for the respective pre-pressure and the respective time periods during which the brake system is pre-charged. Thus, it is possible that the pre-pressures and the periods of time during which the pre-pressure is charged to be adapted, for example, as a function of triggering factors such as, for example, an available collision warning and the general availability of an autonomous braking process by the vehicle. As a result, the performance capability of the brake system can be further advantageously adapted to the respective conditions.

For the measures described above, the disclosure provides a number of basic possibilities of development, as explained below:

Therefore, the counter for the respective time period for pre-charging can be reset during the buildup of the pre-pressure, to be more precise when the function is active, for example when there is active actuation of the brake pedal or of the accelerator pedal and there is an autonomous deceleration request. In other words, each deceleration procedure hereby starts the build-up of pre-pressure from zero time.

In order to prevent possible ongoing operation of the function in all its available operating modes, the function can be reset, for example, after a defined time of its subsequent operation. In this context, the respective magnitude of the possibly prevailing pre-pressure would be reduced again.

The availability of the function can also vary on the basis of the system voltage and/or the ambient temperature to the extent that the individual modes are available over different temperature ranges and/or voltage ranges. It is therefore possible, for example, for the automatic parking operation to be available at temperatures below those of the driver-side deceleration request operation (first triggering factor).

Furthermore, the availability of the respective mode of operation can also be adjusted on the basis of the error status of available sensor elements or other vehicle modules. Thus, the conditions for the availability of the corresponding mode in the case of an autonomous deceleration request (second trigger factor) can be used in such a manner that if a detection device that is intended to provide advance warning of a forwards-directed collision is in a status where it is malfunctioning, the mode for a driver-input deceleration request is available and remains active. As a consequence, the individual modes can be used in an advantageous manner in order to provide a further reduction of the reaction time by means of a corresponding safety means. In this way, for example, the failure of on onboard system can be compensated, at least partially, in its possible effects.

Generally, the respective mode of operation should be available regardless of any steering inputs on the part of the person controlling the vehicle or by means of an autonomous control source. However, possible interventions by the stability control function or the anti-locking function can lead to the function being reset.

Overall, the build-up in accordance with the disclosure of the pre-charged pressure also renders it possible to increase efficiency of the driver-input ESP and/or RSC module (roll stability control). This occurs in particular also in the case of low temperatures. In each case, the method of the present disclosure improves the efficiency in the case of a person controlling the vehicle or a braking maneuver that is implemented by means of autonomous intervention. In addition, the conditions for implementing the automatic parking procedure are significantly improved particularly in the case of low ambient temperatures.

As a factor for determining the magnitude of the adjustable end pre-pressure, it is possible to use, for example, the temperature, in other words the actual ambient temperature and/or the actual temperature of the brake fluid, the vehicle velocity and, for example, a value for the wheel slip of a wheel of a non-driven axle. By way of example, an end pre-pressure of an amount of about 15.0 bar to about 30.0 bar could be set if an automatic emergency braking procedure is detected when a small amount of wheel slip and an ambient temperature of more than 0° C. are present. On the other hand, an end pre-pressure of an amount of about 5.0 bar could be set if an automatic emergency braking procedure is detected when a large amount of wheel slip and an ambient temperature of less than −25° C. are present.

The disclosure uses the ESP module, in other words the ESP pump, to generate a factor-dependent adjustable final pre-pressure in the vehicle brake system, the final pre-pressure being available immediately so that the braking distance is considerably reduced for both the driver-induced brake application (manual braking) and automatic braking events (automatic parking procedures; automatic emergency braking). By way of example, the build-up of pressure in the case of a manual braking event, the automatic emergency braking, the automatic parking procedure, the remote-controlled automatic parking procedure and/or driving are all achieved with respect to a shorter braking distance by means of the adjustable final pre-pressure.

Turning now to the drawings, a flowchart illustrating a method of operating the brake system 100 based on a trigger factor is shown in FIG. 1. As shown in FIG. 1, a determination of the presence of a trigger factor, such as calculation of a quick release of the acceleration pedal, a request for autonomous deceleration, or an automatic parking request is made at step 110. At step 120, the final pre-pressure is set or selected based in part on the trigger. Other factors, such as ambient temperature, road conditions, use of windshield wipers, etc., may also be used in setting the final pre-pressure. Once the pre-pressure is selected, a first pre-pressure is passed to the wheel brake(s) as it builds at step 130, the first pre-pressure can be passed directly to the at least one wheel brake during the buildup of the pre-pressure, moving the brake pads or brake calipers close to the brake component to which they correspond. Additionally or alternatively, the first pre-pressure fills the low pressure storage device. The inlet valve(s) to the wheel brake(s) are then closed at step 140. The pre-pressure continues to build in the brake system (step 150) until the final pre-pressure is built up. When the final pre-pressure is reached, all valves are closed. During the buildup of the final pre-pressure, an anticipated braking procedure (step 160) will cause the inlet valves to open and at least a portion of the pre-pressure to be directed to the wheel brakes (step 170). A similar occurrence of an anticipated braking procedure (step 160) after the buildup of the final pre-pressure also will cause the inlet valves to open and at least a portion of the final pre-pressure to be directed to the wheel brakes (step 170). The final pre-pressure is maintained after buildup, until the occurrence of an anticipated braking procedure, or a time period for maintaining the final pre-pressure expires (step 180). If no braking procedure occurs and the time period for maintaining the final pre-pressure expires, then the final pre-pressure is released and the pressure returns to an original or initial level (step 190) and the method begins again.

The method described above can be performed in one or more devices of the vehicle. For example, the method can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for operating an electromechanical vehicle brake system having an ESP module and at least two brake circuits, each brake circuit comprising high and low pressure switching valves, a low pressure storage device, and two wheel brakes, the method comprising:
   in advance of a possible braking procedure and based on a trigger factor:
      filling the low pressure storage device with an amount of brake fluid at a first pre-pressure while a respective inlet valve of each wheel brake is closed and a respective outlet valve of each wheel brake is opened;
      subsequently using an ESP pump to fill the vehicle brake system, including the low pressure storage device, with an adjustable amount of final pre-pressure;
      closing all valves when the final pre-pressure is achieved; and
   during a braking procedure, opening at least the respective inlet valves and supplying at least a part of the final pre-pressure to the wheel brakes of the vehicle brake system.

2. The method as claimed in claim 1, further comprising detecting a type of a manual release of the gas pedal as a first trigger factor for the build-up of the pre-pressure.

3. The method as claimed in claim 2, further comprising receiving a signal from a collision warning device of the vehicle as a second trigger factor for the build-up of the pre-pressure.

4. The method as claimed in claim 3, further comprising receiving an instruction to initiate an automatic parking process when an ambient temperature does not exceed a threshold value as a third trigger factor for the build-up of the pre-pressure.

5. The method as claimed in claim 1, wherein the braking procedure is implemented due to a manually-initiated deceleration request and/or on the basis of an autonomously-triggered deceleration request.

6. The method as claimed in claim 1, further comprising reducing the pre-pressure, when the anticipated braking procedure does not occur and/or an automatic braking procedure is terminated.

7. The method as claimed in claim 1, further comprising setting the final pre-pressure based in part on at least one of an ambient temperature, vehicle velocity, and wheel slip.

8. An electromechanical vehicle brake system, comprising:
   an ESP module;
   at least two brake circuits, each brake circuit comprising high and low pressure switching valves, a low pressure storage device, and two wheel brakes; and
   a controller configured to:
      in advance of a possible braking procedure and based on a trigger factor:
         fill the low pressure storage device with an amount of brake fluid at a first pre-pressure while a respective inlet valve of each wheel brake is closed and a respective outlet valve of each wheel brake is opened;
         subsequently actuate an ESP pump of the ESP module to fill the vehicle brake system, including the low pressure storage device, with an adjustable amount of final pre-pressure;
         close at least the respective inlet valve and the respective outlet valve of each wheel brake when the final pre-pressure is achieved; and
      during a braking procedure, open at least the respective inlet valves and supply at least a part of the final pre-pressure to the wheel brakes of the vehicle brake system.

9. The electromechanical vehicle brake system of claim 8, wherein the controller is further configured to detect a type of a manual release of the gas pedal as a first trigger factor for the build-up of the pre-pressure.

10. The electromechanical vehicle brake system of claim 8, wherein the controller is further configured to receive a signal from a collision warning device of the vehicle as a second trigger factor for the build-up of the pre-pressure.

11. The electromechanical vehicle brake system of claim 8, wherein the controller is further configured to set the final pre-pressure based in part on at least one of an ambient temperature, vehicle velocity, and wheel slip.

12. A method of operating a vehicle brake system, comprising:
  based on a trigger factor:
    filling a low pressure storage device with brake fluid at a pre-pressure while a respective inlet valve of a wheel brake of the vehicle brake system is closed and a respective outlet valve the wheel brake is opened; and
    during a braking procedure, opening the inlet valve and supplying at least a part of the pre-pressure to the wheel brake.

13. The method of claim 12, wherein filling the low pressure storage device with brake fluid at a pre-pressure comprises filling the low pressure storage device with brake fluid at a first pre-pressure.

14. The method of claim 13, further comprising filling the brake system including the low pressure storage device with a final pre-pressure subsequent to filling the low pressure storage device with brake fluid at the first pre-pressure.

15. The method of claim 14, wherein opening the inlet valve and supplying at least a part of the pre-pressure to the wheel brakes of the vehicle brake system comprises supplying at least a part of the final pre-pressure to the wheel brake.

\* \* \* \* \*